United States Patent [19]

Schofield et al.

[11] Patent Number: 4,889,437

[45] Date of Patent: Dec. 26, 1989

[54] TICKET ISSUING MACHINES

[75] Inventors: Paul Schofield, Camberley; Graham P. Sewell, Iver Heath, both of United Kingdom

[73] Assignee: Almex Control Systems Limited, Middlesex, England

[21] Appl. No.: 219,798

[22] Filed: Jul. 15, 1988

Related U.S. Application Data

[63] Continuation of Ser. No. 898,111, Aug. 19, 1986, abandoned.

[30] Foreign Application Priority Data

Sep. 16, 1985 [GB] United Kingdom ................ 8522843

[51] Int. Cl.⁴ .......................... G07B 15/02; B41J 3/42
[52] U.S. Cl. ......................................... 400/73; 101/66;
156/384; 235/384; 235/432; 235/489; 364/467;
364/519
[58] Field of Search ................ 400/73, 103, 120, 611,
400/692; 101/66, 93.04, 298; 346/76 PH;
156/384, 577, 579, DIG. 47, DIG. 49, DIG. 51;
235/384, 432, 487, 489; 364/467, 519

[56] References Cited

U.S. PATENT DOCUMENTS

| | | | |
|---|---|---|---|
| 3,472,447 | 10/1969 | Rethmeier | 101/68 X |
| 3,855,457 | 12/1974 | Amundson et al. | 101/69 X |
| 3,932,730 | 1/1976 | Ambrosio | 235/432 |
| 4,110,606 | 8/1978 | Prince et al. | 235/432 |
| 4,133,034 | 1/1979 | Etter | 235/432 X |
| 4,257,187 | 7/1988 | Millet | 235/432 |
| 4,381,705 | 5/1983 | Roes et al. | 101/69 |
| 4,519,048 | 5/1985 | Abellana et al. | 101/69 X |
| 4,523,087 | 6/1985 | Benton | 235/432 X |
| 4,609,295 | 9/1986 | Shimodaira | 400/88 |
| 4,634,304 | 1/1987 | Narushima et al. | 400/88 X |
| 4,674,056 | 6/1987 | Goodfellow | 235/432 X |
| 4,734,710 | 3/1988 | Sato et al. | 410/103 X |

FOREIGN PATENT DOCUMENTS

| | | |
|---|---|---|
| 0057080 | 4/1982 | European Pat. Off. . |
| 0125526 | 11/1984 | European Pat. Off. . |
| 0168836 | 1/1986 | European Pat. Off. . |
| 3113175 | 1/1982 | Fed. Rep. of Germany . |
| 1547984 | 7/1979 | United Kingdom . |
| 1553570 | 10/1979 | United Kingdom . |
| 2058674 | 4/1981 | United Kingdom . |
| 2138984 | 10/1984 | United Kingdom . |
| 2140952 | 12/1984 | United Kingdom . |

*Primary Examiner*—Edgar S. Burr
*Assistant Examiner*—James R. McDaniel
*Attorney, Agent, or Firm*—Laurence R. Brown; Alfred J. Mangels

[57] ABSTRACT

This invention is concerned with a ticket issuing machine system including a keyboard 6 to enter into the machine details of a ticket to be issued a printer 1 to print out ticket information on the ticket depending upon the data entered into the keyboard and means 8 for storing information about the tickets issued by the machine and which includes a store circuit board module 12 capable of storing data about the tickets issued and which is readily capable of being inserted into and removed from the ticket issuing machine to have the details of the tickets issued transferred to an exterior store. The machine includes optical emitting means 17, 20 and optical responsive means 8, 19 to enable signals to be passed.

11 Claims, 6 Drawing Sheets

TICKET ISSUING MACHINES

This application is a continuation of application Ser. No. 06/898,111, filed Aug. 19, 1986, now abandoned.

This invention has reference to ticket issuing machines and has particular but not exclusive reference to tickets to be issued for travel by public transport more especially by omnibus or by railway.

It has been known for many years to provide ticket issuing machines comprising various kinds of variations of a printing drum associated with print wheel mechanisms to enable variable information to be printed on the ticket and in which the print wheel mechanism was preset to determine the data to be printed on the ticket. The variable data to be printed on the ticket could relate to the kind of ticket (single, return period); the fare stage (either the stage of boarding or the stage at which the passenger was required to alight), the value of the ticket issued etc. In addition static information was printed on the ticket and this information might refer to the issuing authority and the sequence of the ticket and perhaps the date of issue of the ticket. In addition the ticket machines included registers to enable accumulative information, such as the total number of tickets or the total value of tickets issued during a predetermined period to be displayed. Such registers usually showed an accumulative number which was checked as the conductor was issued with the ticket issuing machine at the start of a duty period and was rechecked at the end of the duty period also some ticket issuing machines were provided to issue preprinted tickets of predetermined denominations. Thus a series of webs of tickets were arranged in a machine each web being printed in a distinctive colour and each representing a certain ticket value on depression of a selected lever a single ticket of a predetermined value (depending upon which lever was depressed) was issued. The machine also included counter mechanisms to indicate the number of tickets of each value issued.

The amount of information which could be printed on the ticket or displayed on counter mechanisms was limited by the number of print wheels or display wheels which could be arranged in the ticket issuing machine as well as by the number of items which could be accommodated on each of the print wheels or display wheels.

In the specifications of British Patents Nos. 1553570 and 547984 there is described a Ticket Issuing Machine for issuing tickets for totalizator betting applications and this machine includes a wire printer mechanism as well as a keyboard, a microprocessor and a matrix display.

Information about bets laid etc. were recorded on a computer usually located at a distance from but connected to the individual ticket issuing machines.

In the Specification of European Patent Application No. 82300282.9 (0057080) there is described a ticket issuing machine for transport undertakings and which comprise a ticket printing device a paper feed device for feeding a ticket web past the printing device, a microprocessor means, a keyboard for entering data into the microprocessor means, a store for retaining information about information to be printed on a ticket which information can be transferred to the microprocessor means to control the ticket printing device under the control of the microprocessor means to determine the information to be printed on the ticket web, and a display panel for displaying information to be entered on the keyboard and information to be printed on the ticket and power means for driving the parts of the ticket issuing machine.

In the specification of British Patent No. 2140952 there is described a ticket issuing machine particularly for use with transport undertakings and a ticket issuing and printing device in which keys respectively associated with the numbers 0 to 9 can be operated in one mode to enter the associated digits for entering the price of a ticket and can be operated in one mode to enter the associated digits for entering the price of a ticket and can be operated in a rapid issue mode to select a complete pre-programmed price associated therewith. In the rapid issue mode the operation of a key will also select a pre-programmed class of ticket. It is an object of the present invention to provide an improved ticket issuing machine.

It is a further object of the present invention to provide an improved ticket issuing machine which is capable of recording data about the tickets issued in a simple and convenient manner.

It is a further object of the present invention to provide a wider range of the record of the tickets issued than has been possible heretofore.

It is also an object of the present invention to provide a ticket issuing machine capable of receiving handling shocks caused by the vehicle carrying the ticket issuing machine accommodating for bad traffic conditions According to the present invention a ticket issuing machine system includes a keyboard to enter into the machine details of a ticket to be issued, a printer to print out ticket information on the ticket depending on the data entered into the keyboard and means for storing information about the tickets issued by the machine characterised by the provision of a store circuit board module capable of storing data about the tickets issued and which is readily capable of being inserted into and removed from the machine to have the details of the tickets issued transferred to an exterior store.

Preferably the ticket issuing machine and the store circuit board module each have an optical emitting means and an optical responsive means to enable signals about the tickets issued to be passed from the ticket issuing machine to the store circuit board module and vice versa. Conveniently the optical emitting means comprises an infra red light emitter and the optical responsive means comprises an infra red light receiver.

Preferably the ticket issuing machine system includes a recorder to enable details of tickets issued and recorded on the store circuit board module to be processed and recorded.

A ticket issuing machine suitable for use on an omnibus or other transport including a store circuit board module according to the present will now be described by way of example with reference to the accompanying drawings wherein.

Figure 1:
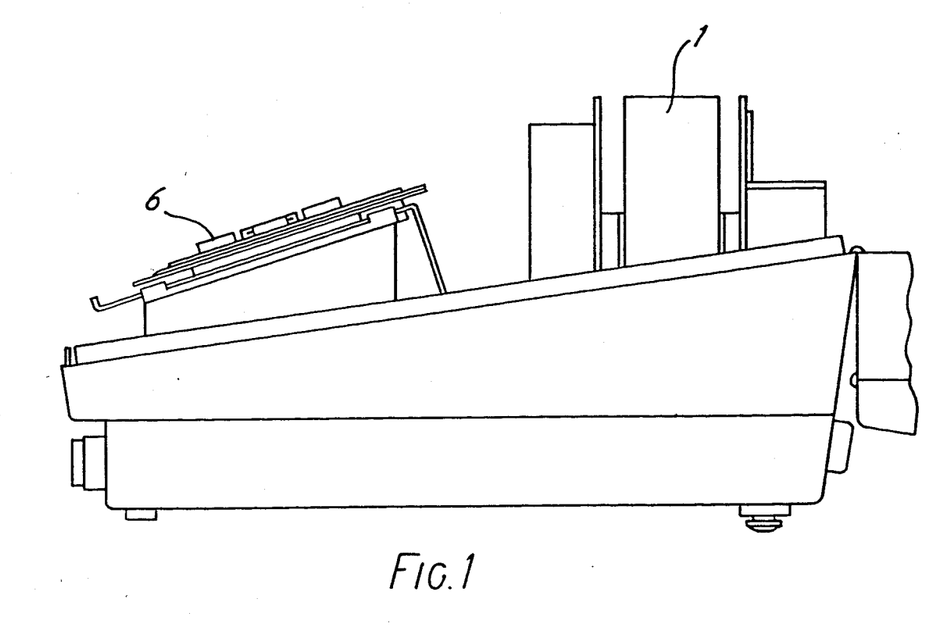
FIG. 1 is a side view of the Ticket Issuing Machine simplified with top cover removed
Figure 2:
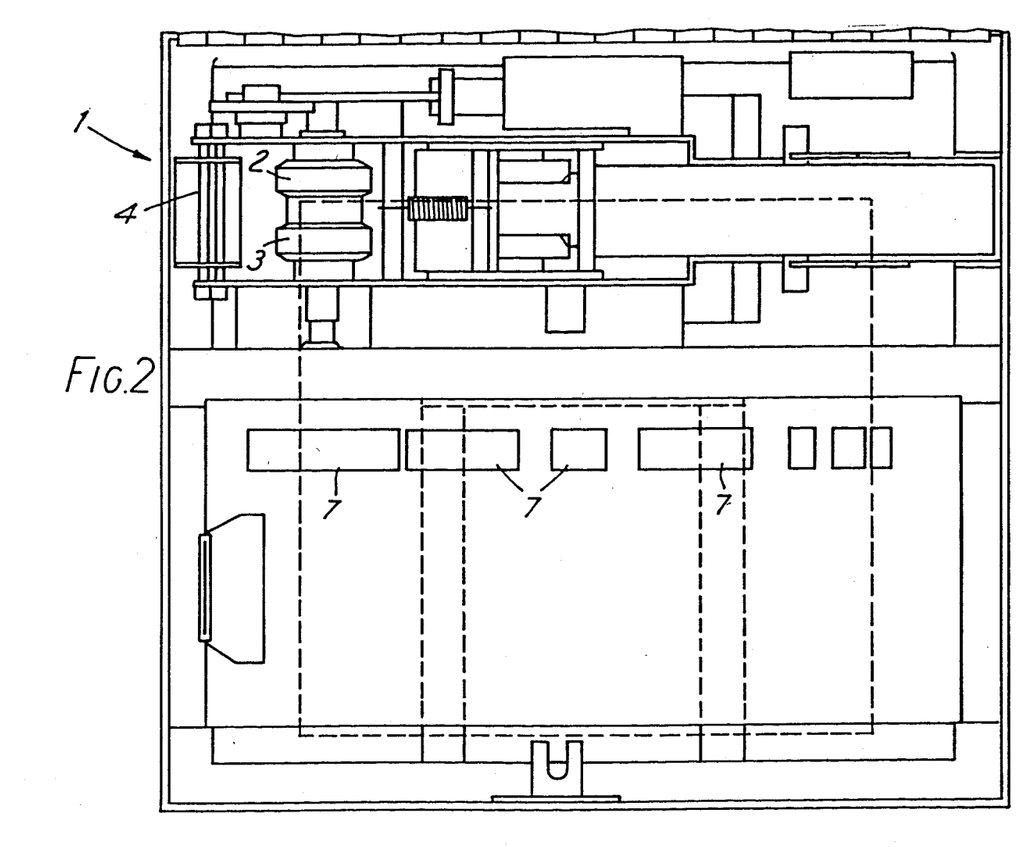
FIG. 2 is a simplified plan view of the ticket issuing machine with the cover keyboard and display and processor circuit board removed
Figure 3:
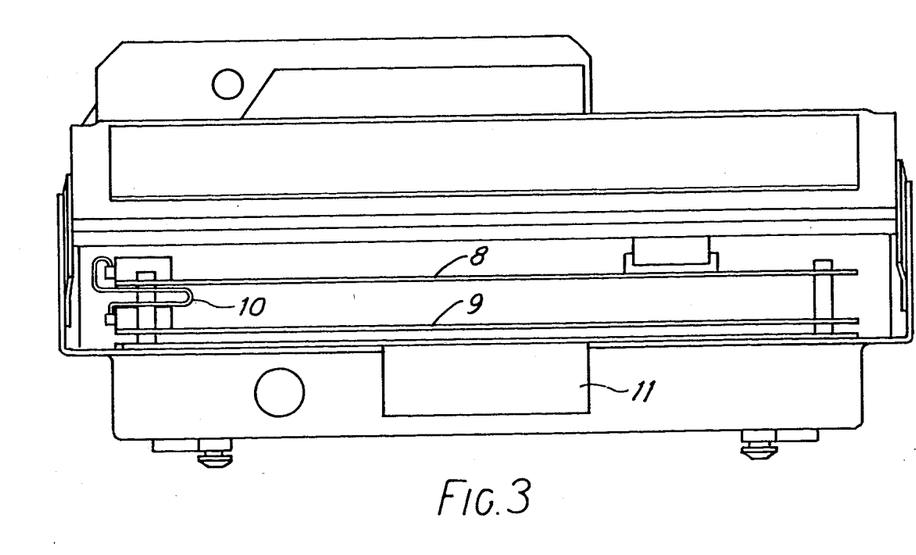
FIG. 3 is a sectional/front view of the machine with cover removed

A keyboard 6 (FIG. 1) is mounted on the upper front part of the machine and a display unit is associated with the keyboard and is arranged to display data entered into the machine (referring for example to the kind of ticket or the value of ticket to be issued) It also displays information or instructions about the kind of data next required to be entered into the machine. The ticket issuing machine is a microprocessor type of ticket issuing machine of the kind described in the Specification of European Patent application No. 0057080/and British Patent No. 2140952 on which the keyboard is operated to effect certain control functions. First of all the driver of the vehicle enters his code number into the machine and any other additional information about the time of start of his shift, the route number of his omnibus etc. When the driver has finished his shift he likewise enters his code number to indicate the shift end. During his tour of duty he enters details of tickets required to be issued perhaps tickets issued by the rapid issue mode or season tickets. Details of such tickets issued appear on the drivers display before the tickets are issued A series of cable assembly terminals 7 are arranged in the machine with connections to and from the processor board 8 (FIG. 3) and the power board 9 which boards 8 and 9 are connected by a ribbon cable 10. Further ribbon cables connect the board 8 and 9 to the keyboard 6, and the processor board to the display unit.

The cable assembly terminals are connected to the main cable assembly and to the respective print head circuits as well as to the "paper out" detector responsive to the ticket web supply being nearly exhausted and to the inch button for feeding the ticket web slowly through the print unit when for example a fresh web is being loaded into the machine.

Beneath the processor board 8 and power board 9 in the ticket issuing machine is a compartment 11 to receive a store circuit board module 12 (FIG. 4) on which details of journeys taken by the vehicle including the details of tickets issued are recorded. This circuit board device includes a circuit board to be hereinafter described and secured within a casing. A latch mechanism 13 is provided at one side of the compartment 11 and this latch mechanism 13 is associated with a release solenoid 14. The latch which includes a fork end member protrudes into a slot in the adjacent side of the circuit board module casing 12 to secure the casing firmly in the ticket issuing machine but on the energisation of the solenoid the latch mechanism is released to enable the circuit board module to be withdrawn. When the circuit board module 12 is inserted into the compartment 11 its leading end carries a pair of electrical contacts 15 which make electrical contact with a pair of electric supply contacts 16 within the ticket issuing machine. The leading end of the circuit board module also carries a pair of infra red photo electric optical emitter (light emitting diode) 17 and optical receiver 18 devices and these emit 17 and receiver 18 devices cooperate with respective optical receiver 19 and emit 20 (light emitting diode) devices in the ticket issuing machine. These emit 17, 20 devices and receive 18, 19 devices serve to transfer trains of pulses from the ticket issuing machine to the circuit board module through the optical emit device 20 and optical receive device 18 of the circuit board module and to transmit trains of pulses from the circuit board through the optical emit device 17 and the optical receive device 19 even when the ticket issuing machine and module may be rendered unstable due to traffic conditions. The module casing 12 and the compartment 11 are so shaped as to prevent the module being inserted into the compartment 11 in an upside down condition or back to front.

Figure 6:
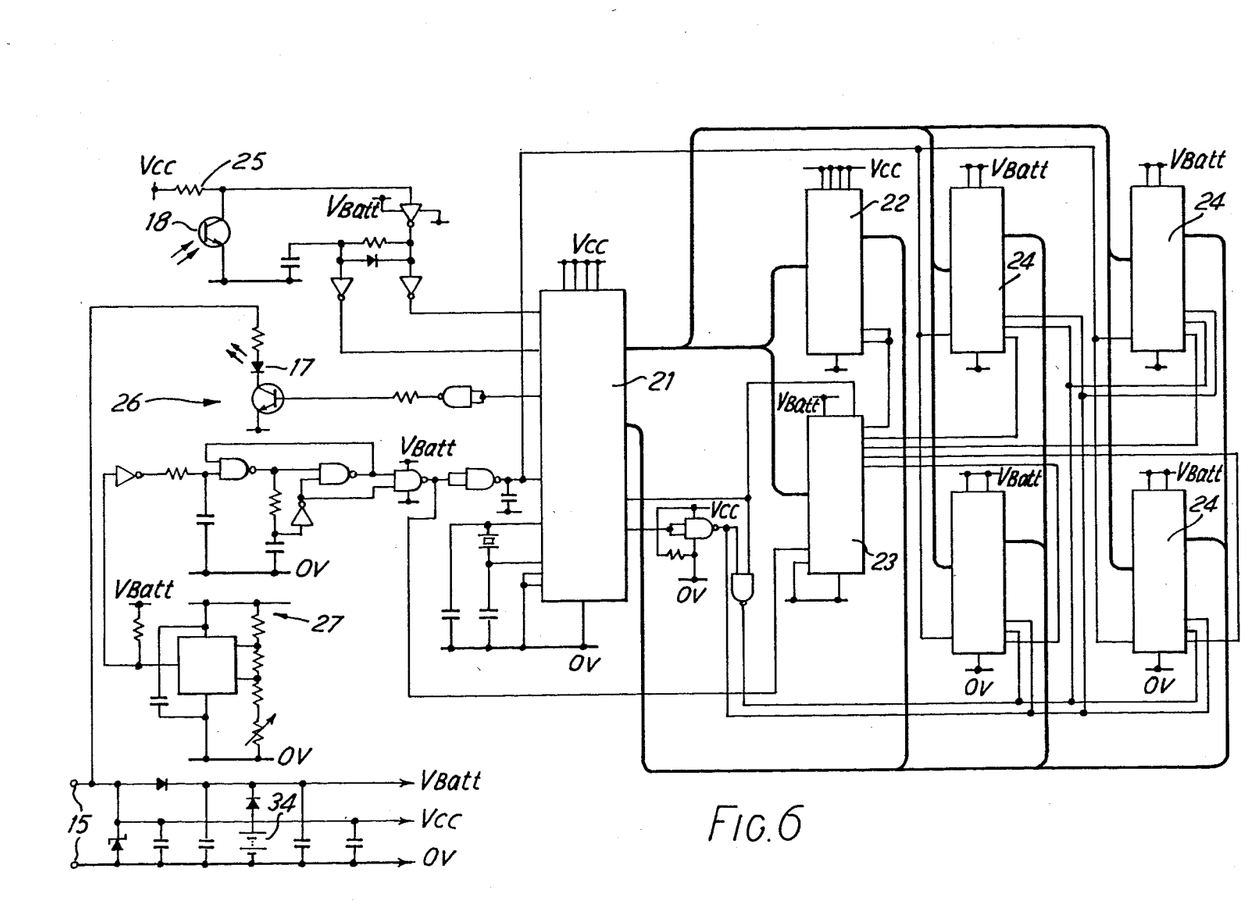
FIG. 6 is a simplified circuit diagram of the store circuit board module

Referring to FIG. 6 of the drawings there is shown a circuit diagram of the store circuit board module. This includes a connection 15 from the ticket issuing machine whereby an electric supply voltage connection is made from the ticket issuing machine and comprises a 5 volt D.C. supply the positive terminal being connected to the V C C connection and the negative terminal being connected to the O.V. connection. A further connection is made to the V CC connection with a reversed bias rectifier between the V Batt and VCC connections. A battery 34 is also connected between the OV and V Batt via a diode connection to maintain signals applied to the memory store circuits to be hereinafter described when the module is disconnected from the voltage supply of the ticket issuing machine or in the event of a power failure. A main processor chip circuit 21 which constitutes a central processing unit, an operational programme memory circuit 22 and a control device circuit 23 as well as four memory store circuits 24 are included. The store circuits store information and data and for example the store circuits may store information about the following :

(a) tickets issued, value of tickets issued;
(b) name of issuing authority, date etc. to be printed on ticket;
(c) information recorded as faretables etc;
(d) details of validation (clocking on time etc.).

The main processor circuit and the operational programme memory circuit are connected to the VCC supply whereas the control device circuit and the memory circuits are connected to the V Batt supply. Each of these circuits are chip circuits and have appropriate address bus etc. connections.

A receiver circuit 25 including an infra red receiving device 18 is arranged to receive an infra red signal from the ticket issuing machine and an emitter circuit 26 including an infra red emitter device 17 are each connected to the main processor circuit 21. A reset circuit 27 is included to ensure that the signals in the circuit board module are retained during power down for example when the module is being removed from the ticket issuing machine compartment.

Figure 7:
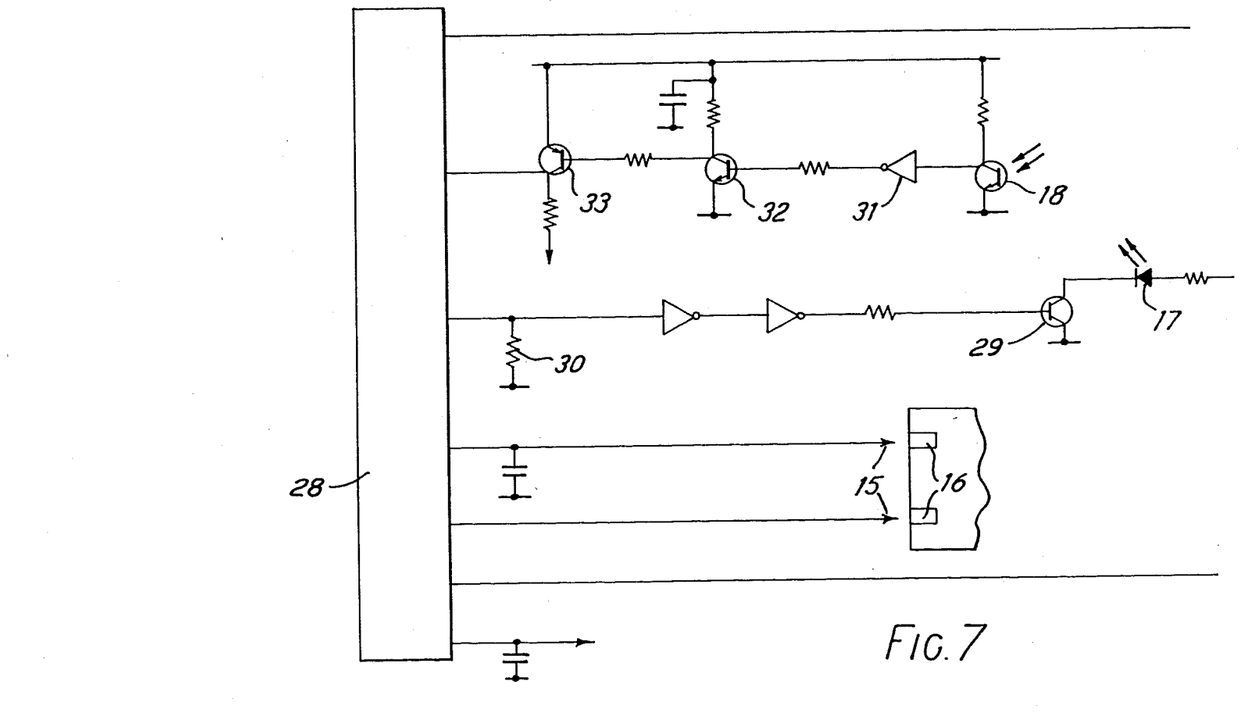
FIG. 7 is a circuit diagram of part of the interface circuit between the store circuit board module and the ticket issuing machine Referring to FIGS. 1, 2 and 3 of the drawings there is shown a Ticket Issuing Machine suitable for use with a Transport undertaking for example for use on an omnibus when the machine is secured to a counter adjacent to the omnibus driver. The Machine includes a Print Unit 1 mounted at the rear of the machine and having two print rollers 2 and 3 (FIG. 2) each having an associated needle print head located/beneath the web guide 4 and web feed means for feeding a ticket web through the printer unit and which are conveniently of the kind described in the specification of our British Patent No. 2058674.

As shown in FIG. 7 a terminal plate 28 being part of the central processing unit of circuit board module has electrical 5 volt supply connections from the ticket issuing machine through contacts 15 and 16.

The emitter (light emitting diode) 17 is connected in a circuit 29 to convert an electrical signal into a light signal and this circuit is associated with a receiver circuit 30.

The receiver 18 is connected in a circuit 31 to change light signals into electrical signals and this circuit 31 is connected to an amplifier and filter circuit 32 as well as a signal level converter circuit.

A recorder unit is arranged to initialise modules at the commencement of a drivers duty period and a non-initialised module is not permitted to be accepted by the ticket issuing machine thus ensuring that unauthorized ticket issue cannot take place.

Figure 4:
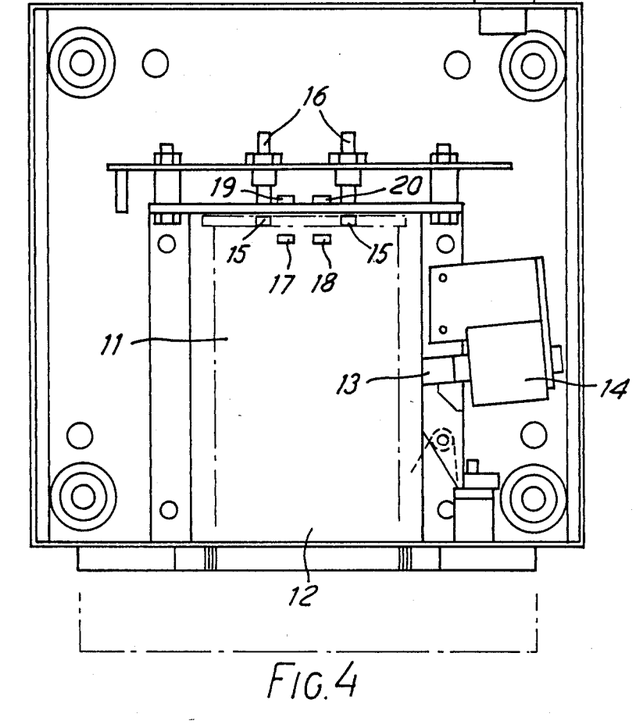
FIG. 4 is a detailed plan/view of the store circuit board and module compartment of the ticket issuing machine
Figure 5:
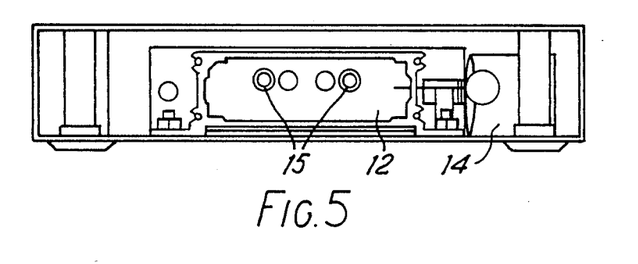
FIG. 5 is a front view of the compartment of FIG. 4

The recorder circuit includes a compartment similar to the compartment 11 of the ticket issuing machine as shown in FIG. 4 and which is capable of receiving a store circuit board module so that data and information can be recorded in the recorder unit. The compartment includes latch mechanism and electrical contacts as well as infra red photo electric optical emitter and receiver devices to cooperate with respective emitter and receiver devices in the store circuit board module to transfer data and information into the recorder. These operate in a similar way to the devices etc. shown in FIG. 4.

In the event of fares adjustment revised information is keyed into the Recorders memory. As each subsequent module is initialised the updated fare information is automatically implanted for transfer into the memory of the ticket issuing machine when the driver takes over his vehicle.

The recorder unit is linked to a tally roll printer for immediate printing of details of all transactions and this may be transferred to a computer for detailed analysis of the data.

In operation the driver inserts his store circuit board module into the ticket issuing machine, he keys his code number into the machine and follows his simple sign-on routine. Once the sign on routine including the routing have been entered the machine is ready to issue tickets. The date entered on to the keyboard is processed by the ticket issuing machine and in relation to ticket issuing data such data entered on the display and printed by the print unit 1 on the ticket issued.

Details of the data entered into the keyboard are transferred to the store circuit board module through the infra red emitter device 20 and receptor device 18 and this data is transferred to the main processor unit 21 and stored in the memory store circuits 22 under the control of the control circuits. This procedure is followed during the drivers tour of duty and at the end of this tour he keys into the ticket issuing machine his sign off number which operates to release the solenoid latch mechanism 13 and permit the store circuit board module to be released. The module is then taken by the driver to the depot at the end of his shift when he inserts the module into the recorder which gives the driver a receipt and by transferring a train of pulses from the module to the recorder to print out details of the data stored in the memory store circuits 21 of the module and to transfer details of such data stored into the recorder store for processing.

As the ticket issuing machine includes a buffer memory information about the previous removals and replacements of the module are recorded. Thus an accumulating grand total of tickets issued and cash received is held permanently in the ticket issuing machines memory.

We claim:

1. A ticket issuing machine system for a transport undertaking comprising: a ticket issuing machine including a housing having a storage compartment for removably receiving information storage means; a keyboard on the housing for entering into the machine information including details of a ticket to be issued by the machine: a printer within the housing for printing out ticket information on a ticket based upon information entered in the keyboard; removable information storage means for storing accumulative summary information about tickets issued by the machine, the removable information storage means including a storage circuit board module including a memory for storing selected accumulative summary information about tickets issued by the machine, the storage circuit board module being insertable in the storage compartment for receiving issued accumulative summary ticket information from the ticket issuing machine and being removable from the storage compartment; and external storage means separate from the ticket issuing machine and including information transfer means for removably receiving the storage circuit board module for insertion therein and removal therefrom and for receiving accumulative summary information about tickets issued by the machine and stored in the memory of the storage circuit board module, wherein the ticket issuing machine and the storage circuit board module each include respective optical emitting means and optical receiving means to enable accumulative summary information signals about the tickets issued by the machine to be passed between the ticket issuing machine and the storage circuit board module, and wherein the external storage means includes optical emitting means and optical receiving means cooperable with the optical emitting means and optical receiving means cooperable with the optical emitting means and the optical receiving means of the storage circuit board module for transmitting information between the storage circuit board module and the external storage means to permit accumulative summary information relating to the tickets issued by the machine to be transferred from the storage circuit board module to the external storage means.

2. A ticket issuing machine system according to claim 1, wherein the optical emitting means include an infra red light emitter and the optical receiving means include an infra red light receiver.

3. A ticket issuing machine system according to claim 1, including positioning means carried by the ticket issuing machine for accurately positioning the storage circuit board module within the ticket issuing machine in a predetermined position, and latch means to selectively release and secure the circuit module within the ticket issuing machine.

4. A ticket issuing machine system according to claim 1, wherein the storage circuit board module and the ticket issuing machine each include respective complementary electrical contacts to make an electrical connection therebetween to supply electric power from the ticket issuing machine to the storage circuit board module to enable information on tickets issued to be recorded on the storage circuit board module.

5. A ticket issuing machine system according to claim 1, wherein the storage circuit board module includes independent battery means operative to retain signals stored in a memory of the storage circuit board module when the module is disconnected from an external source of electrical power.

6. A ticket issuing machine system as claimed in claim 1, wherein the storage circuit board module includes memory means for receiving and retaining data signals relating to transit routes and timetables from the external storage means for transmission to the storage circuit board module for use in the ticket issuing machine.

7. A ticket issuing machine system according to claim 1, wherein the external storage means includes recording means for receiving and recording information on tickets issued that has been recorded on the storage circuit board module.

8. A travel ticket issuing system comprising:
(a) a ticket issuing machine for printing and issuing travel tickets, the machine including:
  (1) a housing having a storage compartment for removably receiving information storage means;
  (2) a keyboard on the housing for entering into the machine input information for tickets to be issued by the machine;
  (3) a printer within the housing for printing on a ticket information corresponding to at least some of the input information;
  (4) ticket supply means within the housing for providing a supply of tickets to the printer;
  (5) ticket feed means within the housing for feeding tickets from the ticket supply means to the printer and for feeding printed tickets from the printer to a ticket discharge slot in the housing;
  (6) removable information storage means for storing information relating to the number and fare amounts of tickets issued by the machine, the removable information storage means including a storage circuit board module including a memory for storing selected information about tickets issued by the machine, the storage circuit board module being insertable in the storage compartment for receiving issued ticket information from the ticket issuing machine and being removable from the storage compartment;
(b) external storage means separate from the ticket issuing machine and including information transfer means for removably receiving the storage circuit board module for insertion therein and removal therefrom and for receiving information about tickets issued by the machine and stored in the memory of the storage circuit board module;
(c) wherein the ticket issuing machine and the storage circuit board module each include respective optical emitting means and optical receiving means to enable information signals about the tickets issued by the machine to be passed between the ticket issuing machine and the storage circuit board module, and wherein the external storage means includes optical emitting means and optical receiving means cooperable with the optical emitting means and optical receiving means of the storage circuit board module for transmitting information between the storage circuit board module and the external storage means to permit information relating to the tickets issued by the machine to be transferred from the storage circuit board module to the external storage means.

9. A travel ticket issuing system in accordance with claim 8, including display means in the housing for visually displaying data entered into the machine on the keyboard.

10. A travel ticket issuing system in accordance with claim 8, wherein the storage circuit board module includes control program means operatively connected with the keyboard, the printer, and the removable information storage means for processing input information and for controlling operation of the printer.

11. A travel ticket issuing system accordance with claim 10, wherein the storage circuit board module includes fare table storage means for storing fare information.

* * * * *